US010109848B2

(12) United States Patent
Murata et al.

(10) Patent No.: US 10,109,848 B2
(45) Date of Patent: Oct. 23, 2018

(54) NEGATIVE ELECTRODE MATERIAL FOR LITHIUM ION BATTERIES AND USE THEREOF

(71) Applicants: SHOWA DENKO K.K., Tokyo (JP); UMICORE, Brussels (BA)

(72) Inventors: Hirokazu Murata, Tokyo (JP); Masataka Takeuchi, Tokyo (JP); Nobuaki Ishii, Tokyo (JP); Sam Siau, Brussels (BE); Nicolas Marx, Brussels (BE); Stijn Put, Brussels (BE)

(73) Assignees: SHOWA DENKO K.K., Tokyo (JP); UMICORE, Brussels (BE)

( * ) Notice: Subject to any disclaimer, the term of this patent is extended or adjusted under 35 U.S.C. 154(b) by 163 days.

(21) Appl. No.: 14/909,762

(22) PCT Filed: Aug. 4, 2014

(86) PCT No.: PCT/JP2014/070458
§ 371 (c)(1),
(2) Date: Feb. 3, 2016

(87) PCT Pub. No.: WO2015/019994
PCT Pub. Date: Feb. 12, 2015

(65) Prior Publication Data
US 2016/0190552 A1 Jun. 30, 2016

(30) Foreign Application Priority Data

Aug. 5, 2013 (JP) ................................. 2013-162833

(51) Int. Cl.
H01M 4/36 (2006.01)
H01M 4/48 (2010.01)
(Continued)

(52) U.S. Cl.
CPC ............. *H01M 4/364* (2013.01); *C01B 32/05* (2017.08); *C01B 32/20* (2017.08); *H01M 4/134* (2013.01);
(Continued)

(58) Field of Classification Search
CPC ........ H01M 4/36; H01M 4/364; H01M 4/366; H01M 4/48; H01M 4/38; H01M 4/386;
(Continued)

(56) References Cited

U.S. PATENT DOCUMENTS 7,141,187 B2 * 11/2006 Kosuzu ................. H01M 4/134
252/521.3
7,785,661 B2 8/2010 Carel et al.
(Continued)

FOREIGN PATENT DOCUMENTS

CN 1742397 A 3/2006
CN 102958835 A 3/2013
(Continued)

OTHER PUBLICATIONS

International Search Report for PCT/JP2014/070458 dated Sep. 2, 2014.
(Continued)

*Primary Examiner* — Karie O'Neill Apicella
(74) *Attorney, Agent, or Firm* — Sughrue Mion, PLLC

(57) ABSTRACT

The present invention relates to a negative electrode material for a lithium ion battery, made of a composite material comprising silicon-containing particles, artificial graphite particles and a carbon coating layer, wherein the silicon-containing particles are silicon particles having a SiOx layer ($0 < x \leq 2$) on a particle surface, have an oxygen content ratio of 1 mass % or more and 18 mass % or less, and mainly comprise particles having a primary particle diameter of 200 nm or less; and the artificial graphite particles have a
(Continued)

scale-like shape. By using the negative electrode material, a lithium ion battery having a high capacitance and excellent charge-discharge cycle characteristics can be produced.

10 Claims, 1 Drawing Sheet

(51) Int. Cl.
    *H01M 4/38*       (2006.01)
    *H01M 4/62*       (2006.01)
    *H01M 4/587*     (2010.01)
    *H01M 10/0525*  (2010.01)
    *H01M 4/134*     (2010.01)
    *C01B 32/05*      (2017.01)
    *C01B 32/20*      (2017.01)
    *H01M 4/02*       (2006.01)

(52) U.S. Cl.
    CPC .......... *H01M 4/366* (2013.01); *H01M 4/386* (2013.01); *H01M 4/587* (2013.01); *H01M 4/625* (2013.01); *H01M 10/0525* (2013.01); *H01M 2004/027* (2013.01); *Y02T 10/7011* (2013.01)

(58) Field of Classification Search
    CPC ........ H01M 4/62; H01M 4/625; H01M 4/587; H01M 10/0525
    See application file for complete search history.

(56) References Cited

U.S. PATENT DOCUMENTS

| | | |
|---|---|---|
| 2005/0074672 A1 | 4/2005 | Matsubara et al. |
| 2009/0202911 A1 | 8/2009 | Fukuoka et al. |
| 2009/0239151 A1 | 9/2009 | Nakanishi et al. |
| 2012/0009452 A1 | 1/2012 | Ueda |
| 2012/0208083 A1* | 8/2012 | Ati ..................... H01M 4/0419 429/211 |
| 2012/0244428 A1 | 9/2012 | Park et al. |
| 2013/0136986 A1 | 5/2013 | Scoyer et al. |

FOREIGN PATENT DOCUMENTS

| | | | |
|---|---|---|---|
| EP | 2 924 783 A1 | 9/2015 | |
| JP | 2000-272911 A | 10/2000 | |
| JP | 2004-185810 A | 7/2004 | |
| JP | 2004-213927 A | 7/2004 | |
| JP | 2005-108774 A | 4/2005 | |
| JP | 2005-243508 A | 9/2005 | |
| JP | 2008-186732 A | 8/2008 | |
| JP | 2009-212074 A | 9/2009 | |
| JP | 2009-259723 A | 11/2009 | |
| JP | 2010-272540 A | 12/2010 | |
| JP | 2010272540 A * | 12/2010 | ............ H01M 4/587 |
| JP | 2012-43546 A | 3/2012 | |
| JP | 2012-43547 A | 3/2012 | |
| JP | 2012043546 A * | 3/2012 | ............. H01M 4/36 |
| JP | 2013-505547 A | 2/2013 | |
| JP | 2014-60124 A | 4/2014 | |
| KR | 10-2005-0084413 A | 8/2005 | |
| WO | 2005/031898 A1 | 4/2005 | |
| WO | 2011/027503 A1 | 3/2011 | |
| WO | 2013/141104 A1 | 9/2013 | |

OTHER PUBLICATIONS

Communication dated Nov. 21, 2016, from the European Patent Office in counterpart European Application No. 14834582.0.
Klauser F et al "Oxidation study of silicon nanoparticle thin films on HOPG", Surface Science, North-Holland, Amsterdam, NL, vol. 603, No. 19, Aug. 15, 2009, pp. 2999-3004.
Karim Zaghib et al "Influence of edge and basal plane sites on the electrochemical behavior of flake-like natural graphite for Li-ion batteries", Journal of Power Sources, Elsevier SA, CH, vol. 97, Dec. 23, 2000, pp. 97-103.
Communication dated Aug. 16, 2017, from Korean Intellectual Property Office in counterpart application No. 10-2016-7003361.
Communication dated Mar. 2, 2018 issued by the European Patent Office in corresponding European application No. 14 834 582.0.

* cited by examiner

[FIG. 1]
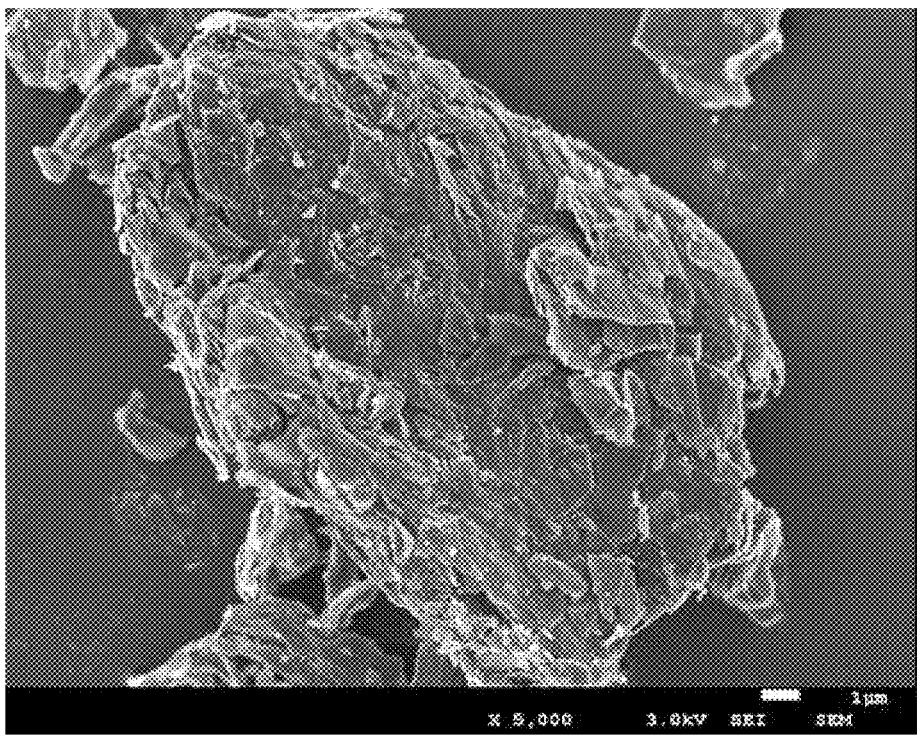
[FIG. 2]
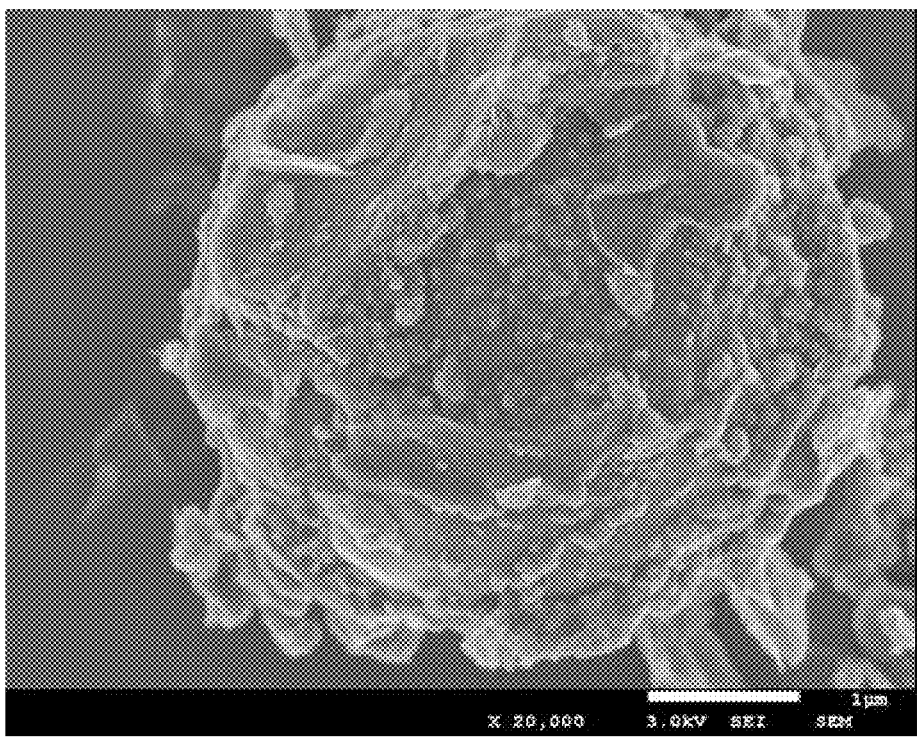

NEGATIVE ELECTRODE MATERIAL FOR LITHIUM ION BATTERIES AND USE THEREOF

CROSS REFERENCE TO RELATED APPLICATIONS

This application is a National Stage of International Application No. PCT/JP2014/070458 filed Aug. 4, 2014, claiming priority based on Japanese Patent Application No. 2013-162833 filed Aug. 5, 2013, the contents of all of which are incorporated herein by reference in their entirety.

TECHNICAL FIELD

The present invention relates to a negative electrode material for lithium ion batteries and use thereof. Specifically, the present invention relates to a negative electrode which is capable of obtaining lithium ion batteries having a large charge-discharge capacitance and excellent charge/discharge cycle characteristics; a paste comprising the negative electrode; a negative electrode sheet obtained by the application of the paste; and a lithium ion battery comprising the negative electrode sheet.

BACKGROUND ART

Multi-functionalization of a portable electronic device has proceeded faster than power saving of an electronic component. Therefore, the portable electronic device has been increased in power consumption. In consequence, a lithium ion battery serving as a main power supply of the portable electronic device has been required to have a high capacity and a small size more strongly than ever before. In addition, along with growing demand for an electric vehicle, also a lithium ion battery to be used in the electric vehicle has been strongly required to have a high capacity.

Graphite has hitherto been mainly used as a negative electrode material for the lithium ion battery. Graphite exhibits excellent cycle characteristics, but can stoichiometrically occlude lithium only up to a ratio of LiC6. Therefore, a theoretical capacity of graphite for a negative electrode is 372 mAh/g.

In order to realize a high capacity of the lithium ion battery, an investigation has been made on using particles containing a metal element having a high theoretical capacity, such as Si or Sn, for the negative electrode material. For example, the theoretical capacity of a lithium ion battery using particles containing Si for the negative electrode material is 4,200 mAh/g. The theoretical capacity of a lithium battery using metal lithium for a negative electrode is 3,900 mAh/g, and hence it is expected that a lithium ion battery having a smaller size and a higher capacity than those of the lithium battery is obtained when Si or the like can be used for the negative electrode material. However, the negative electrode material, such as Si, shows a high expansion rate and a high contraction rate in association with intercalation and deintercalation (occlusion and release) of lithium ions. Therefore, a capacity as high as that expected is not obtained owing to a gap generated between the particles. In addition, the particles are broken to be finer through repetition of great expansion and contraction. Therefore, electrical contact is disrupted and hence internal resistance increases. In consequence, the lithium ion battery to be obtained has a drawback of a short charge-discharge cycle lifetime.

In view of the foregoing, various composite negative electrode materials each combining a carbonaceous material and Si have been proposed. For example, there have been proposed: a composite material prepared by immobilizing Si ultrafine particles onto the surfaces of graphite particles, and mixing petroleum mesophase pitch therewith, followed by carbonization (Patent Document 1); a composite material prepared by mechanically pulverizing Si powder and natural graphite with a planetary ball mill to embed Si in the graphite, and then dissolving a carbon fiber and coal tar pitch in THF, followed by carbonization (Patent Document 2); a composite material prepared by mixing spherical natural graphite, Si, and PVA serving as a pore forming agent, and mixing binder pitch therewith under heating, followed by carbonization, and further mixing binder pitch and acetylene black therewith, followed by carbonization (Patent Document 3); a composite material prepared by mixing Si and powder pitch, and further dry-mixing artificial graphite therewith, followed by two-stage firing of tar removal at 600° C. and carbonization at 900° C. (Patent Document 4); and a composite material prepared by mixing a solution in which graphite is dispersed in xylene, a solution in which petroleum pitch is dispersed in xylene, and a solution in which pitch and Si are dispersed in xylene, followed by carbonization (Patent Document 5). Further, there has been proposed a production method of preparing a composite material by: mixing and kneading flake natural graphite, Si, and coal tar pitch in tar oil with a biaxial kneader; removing tar from the mixture at 450° C. and pulverizing the mixture; applying a compressive force and a shear force with Mechanofusion (trademark) system; and carbonizing the resultant at 1,000° C. (Patent Document 6).

PRIOR ART

Patent Documents

[Patent Document 1] JP 2005-108774 A (US 2005/074672 A1)
[Patent Document 2] JP 2000-272911 A
[Patent Document 3] JP 2008-186732 A
[Patent Document 4] JP 2004-213927 A
[Patent Document 5] U.S. Pat. No. 7,785,661 B2
[Patent Document 6] JP 2005-243508 A

DISCLOSURE OF THE INVENTION

Problem to be Solved by the Invention

An object of the present invention is to provide a material exhibiting excellent characteristics as a negative electrode material for a lithium ion battery.

Means to Solve the Problem

The present invention relates to the followings.
[1] A negative electrode material for a lithium ion battery, made of a composite material comprising silicon-containing particles, artificial graphite particles and a carbon coating layer, wherein the silicon-containing particles are silicon particles having a SiOx layer (0<x≤2) on a surface of the particle, have an oxygen content ratio of 1 mass % or more and 18 mass % or less, and mainly comprise particles having a primary particle diameter of 200 nm or less; and the artificial graphite particles have a scale-like shape.
[2] The negative electrode material for a lithium ion battery as described in [1] above, wherein the content of the silicon-containing particles is 5 parts by mass or more and 30 parts by mass or less to 100 parts by mass of the artificial graphite particles.

[3] The negative electrode material for a lithium ion battery as described in [1] or [2] above, wherein the ratio $I_G/I_D$ (G value) between the peak area ($I_G$) of a peak in a range of 1580 to 1620 cm$^{-1}$ and the peak area ($I_D$) of a peak in a range of 1300 to 1400 cm$^{-1}$ measured by Raman spectroscopy spectra when an edge surface of the artificial graphite particle is measured with Raman microspectrometer is 5.2 or more and 100 or less; the average interplanar spacing d002 of plane (002) of the artificial graphite particles by the X-ray diffraction method is 0.337 nm or less; and by observing the optical structures in the cross-section of the formed body made of the artificial graphite particles in a rectangular field of 480 μm×640 μm under a polarizing microscope, when areas of the optical structures are accumulated from a smallest structure in an ascending order, SOP represents an area of an optical structure whose accumulated area corresponds to 60% of the total area of all the optical structures; when the structures are counted from a structure of a smallest aspect ratio in an ascending order, AROP represents the aspect ratio of the structure which ranks at the position of 60% in the total number of all the structures; and when D50 represents a volume-based average particle diameter by laser diffraction method; SOP, AROP and D50 satisfy the following relationship:

$1.5 \leq AROP \leq 6$ and $0.2 \times D50 \leq (SOP \times AROP)^{1/2} < 2 \times D50$.

[4] The negative electrode material for a lithium ion battery as described in any one of [1] to [3] above, wherein a volume-based average particle diameter by laser diffraction method (D50) is 5 μm or more and 30 μm or less.

[5] The negative electrode material for a lithium ion battery as described in any one of [1] to [4] above, the BET specific surface area of which is 7 m$^2$/g or more and 20 m$^2$/g or less.

[6] The negative electrode material for a lithium ion battery as described in any one of [1] to [5] above, wherein the ratio $I_G/I_D$ (G value) between the peak area ($I_G$) of a peak in a range of 1580 to 1620 cm$^{-1}$ and the peak area ($I_D$) of a peak in a range of 1300 to 1400 cm$^{-1}$ measured by Raman spectroscopy spectra is 1.65 or more and 10 or less.

[7] The negative electrode material for a lithium ion battery as described in any one of [1] to [6] above, wherein the average interplanar spacing d002 of plane (002) by the X-ray diffraction method is 0.339 nm or less.

[8] The negative electrode material for a lithium ion battery as described in any one of [1] to [7] above, wherein the carbon coating layer is obtained by subjecting petroleum pitch or coal pitch to heat treatment.

[9] The negative electrode material for a lithium ion battery as described in any one of [1] to [8] above, wherein the mass of the carbon coating layer is 5 mass % or more and 30 mass % or less in the composite material.

[10] A paste comprising the negative electrode material for a lithium ion battery described in any one of [1] to [9] above and a binder.

[11] An electrode using a formed body of the paste for an electrode described in [10] above.

[12] A lithium ion battery comprising the electrode described in [11] above as a constituting element.

Effects of the Invention

The negative electrode material of the present invention has a large discharge amount per mass. In addition, through use of the negative electrode material, the lithium ion battery having a high capacitance and excellent charge-discharge cycle characteristics can be produced.

BRIEF DESCRIPTION OF THE DRAWINGS

FIG. 1 is a scanning electron microscope image of the negative electrode material in Example 3.

FIG. 2 is a scanning electron microscope image of the negative electrode material in Comparative Example 1.

MODE FOR CARRYING OUT THE INVENTION (Silicon-Containing Particles)

In a preferred embodiment of the present invention, the silicon-containing particles are the silicon particles which have a SiOx layer (0<x≤2) on a particle surface. Or, the entire of the silicon-containing particles may be made of the SiOx layer (0<x<2). In addition, the silicon-containing particles may contain pure silicon particles.

The average thickness of the SiOx layer is preferably 0.5 nm or more and 10 nm or less. When the average thickness is 0.5 nm or more, the fine particles can be in a stable state in which further oxidation does not occur on a surface portion upon exposure to air or an oxidizing gas. In addition, when the average thickness is 10 nm or less, an increase in irreversible capacity in initial stage cycles can be suppressed. The average thickness is measured through a TEM photograph.

The silicon-containing particles mainly comprise particles having a primary particle diameter of 200 nm or less. Here, the "primary particle diameter" may be measured through micrograph observation with a SEM, a TEM, or the like, and the "main component" means that, in at least one field in the micrograph observation, 90% (number-based) or more of primary particles each have a diameter of 200 nm or less.

In addition, the silicon-containing particles have a number-based average particle diameter of the primary particles calculated by the following equation of preferably 30 nm or more and 150 nm or less, more preferably 30 nm or more and 120 nm or less.

$d_{av} = 6/(\rho \times BET)$

On the assumption that the fine particles are dense spheres having an average diameter $d_{av}$ BET: BET specific surface area (m$^2$/g) based on nitrogen adsorption ρ: true density of silicon particles (2.33 g/cm$^3$ as a theoretical value)

When the average particle diameter falls within the above-mentioned range, volume strain in association with intercalation of Li into a Si crystal phase can be reduced, and hence expansion and contraction in association with charge and discharge, which are the greatest drawback in the case of using Si for a negative electrode active material, can be suppressed.

With respect to the primary particles of the silicon particles in the composite material, they can be evaluated by confirming whether the primary particles have a number-based average particle diameter of 30 nm or more and 150 nm or less when it is calculated by the image analysis of the spherical particles in the image of the surface coating layer of the composite observed by a 100,000-power transmission electron microscope.

The silicon-containing particles may further contain element M selected from other metal elements and metalloid elements (including carbon) therein. Specific examples of M include, for example, nickel, copper, iron, tin, aluminum and cobalt. There is no particular limit on the content of element M as long as it is within a scope which does not inhibit the silicon action significantly. The content is, for example, 1 mole or less per mole of silicon atoms.

The oxygen content ratio of the silicon-containing particles in the entirety of the particles is preferably 1 mass % or more and 18 mass % or less, more preferably 2 mass % or more and 10 mass % or less. The oxygen content ratio may be quantified by, for example, inductively coupled plasma (ICP).

Such silicon-containing particles may be produced by, for example, a method disclosed in WO 2012/000858 A1.

(Artificial Graphite Particles)

The graphite used as an electrode active substance of the lithium secondary battery is excellent in coulomb efficiency at initial charge and discharge. However, there is an upper limit to the stoichiometric proportion of the lithium atom intercalation to carbon atoms and it is difficult to increase the energy density per mass to the stoichiometric proportion or higher. Therefore, it is necessary to increase the mass per electrode volume: i.e. the electrode density to improve the energy density of the electrode.

Generally, an electrode for a battery is produced by drying an active substance applied onto a current collector plate and subsequent pressing. Pressing improves the filling property of the active substance per volume, and if the active substance is soft enough to be deformed to some degree by pressing, it is possible to significantly increase the electrode density. Since graphite particles are hard when the graphite has a complicated structure or low orientation, it is desirable to allow the graphite particles to have a large structure in order to increase the electrode density. It has been long known that there is a structure which exhibits optical anisotropy by crystals developed and graphite planes arranged, and a structure which exhibits optical isotropy by crystals not-developed completely or largely disordered such as hard carbon. With respect to the observation of these structures, a crystal size can be measured by the X-ray diffraction method and the structures can be observed by a polarizing microscope observation method described in, for example, "Modern Carbon Material Experimental Technology (Analysis part) edited by The Carbon Society of Japan (2001), published by Sipec Corporation, pages 1-8". In the present description, a structure in which polarization can be observed is referred to as an optical structure.

In the artificial graphite particles in a preferred embodiment of the present invention, the size and shape of the optical structures are within a specific range. Furthermore, due to an appropriate degree of graphitization, it becomes a material being excellent both in easiness to be collapsed as a material for an electrode and in battery properties.

With respect to the size and shape of the optical structure, it is desirable that the above-mentioned artificial graphite particles satisfy the following formula:

1.5≤$AROP$≤6 and 0.2×$D50$≤($SOP$×$AROP$)$^{1/2}$<2×$D50$

By observing optical structures in the cross-section of the formed body made of the carbon material in a rectangular field of 480 μm×640 μm under a polarizing microscope, when areas of the optical structures are accumulated from the smallest structure in an ascending order, SOP represents the area of the optical structure whose accumulated area corresponds to 60% of the total area of all the optical structures. When the structures are counted from a structure of the smallest aspect ratio in an ascending order, AROP represents the aspect ratio of the structure which ranks at the position of 60% in the total number of all the structures.

D50 represents a particle diameter corresponding to the accumulated diameter of 50% of the cumulative total of diameters (an average particle diameter) based on a volume measured by laser-diffractmetry particle size distribution analyzer, and represents an apparent diameter of the scale-like particles. As a laser diffraction type particle size distribution analyzer, for example, Mastersizer (registered trademark) produced by Malvern Instruments Ltd. or the like can be used.

The artificial graphite particles in a preferred embodiment of the present invention have a scale-like shape. Since the optical structures in the carbon material are cured while flowing, it is often strip-shaped. When the cross-section of a formed body composed of the carbon material is observed, the shape of the optical structures is almost rectangular, and it can be assumed that the area of the structure corresponds to the product of the longer diameter and the shorter diameter of the structure. Also, the shorter diameter is the longer diameter/aspect ratio. Assuming that the optical structure as an object to be measured for the area represented by SOP and the optical structure as an object to be measured for the aspect ratio represented by AROP are the same, the longer diameter in the optical structure turns to be (SOP×AROP)$^{1/2}$. That is, (SOP×AROP)$^{1/2}$ defines the longer diameter in an optical structure having a specific size, and based on the ratio of (SOP×AROP)$^{1/2}$ to the average particle diameter (D50), the above-mentioned formula defines that the optical structure is larger than a certain size.

(SOP×AROP)$^{1/2}$ which defines a longer diameter of an optical structure is generally smaller than an average particle diameter D50. However, when the (SOP×AROP)$^{1/2}$ value is closer to D50, it means that the particles in the carbon material consist of a smaller number of optical structures. In a case where (SOP×AROP)$^{1/2}$ is smaller compared to D50, it means that the particles in the carbon material comprise a large number of optical structures. When the (SOP×AROP)$^{1/2}$ value is 0.2×D50 or more, there are fewer borders of the optical structures, which is preferable for the lithium ion diffusion and enables a high-rate charge and discharge. When the value is larger, the carbon material can retain a larger number of lithium ions. The value is preferably 0.25×D50 or more, more preferably 0.28×D50 or more, and still more preferably 0.35×D50 or more. The value is less than 2×D50 at maximum, and preferably 1×D50 or less.

The average particle diameter (D50) of the artificial graphite particles in a preferred embodiment of the present invention is 1 μm or more and 50 μm or less. Pulverizing by special equipment is required to make D50 less than 1 μm and more energy is required as a result. On the other hand, if the D50 value is too large, it takes a longer time for the lithium diffusion in the negative electrode material and it tends to reduce the charge and discharge rate. A preferred D50 value is from 5 μm to 35 μm. Considering that fine powder has a large surface area and is likely to give rise to an unintended reaction so that it should be reduced, D50 is more preferably 10 μm or more. When the carbon material is for use in the driving power source for automobile and the like which requires generating a large current, D50 is preferably 25 μm or less.

The aspect ratio of the artificial graphite particles in a preferred embodiment of the present invention, AROP, is from 1.5 to 6, more preferably from 2.0 to 4.0. An aspect ratio larger than the above lower limit is preferable because it allows the optical structures to slide over each other and an electrode having a high density can be easily obtained. An aspect ratio smaller than the upper limit is preferable because it requires less energy to synthesize a raw material.

The methods for observation and analysis of the optical structures are as described below.

[Production of Polarizing Microscope Observation Sample]

The "cross-section of the formed body made of artificial graphite particles" in the present invention is prepared as follows.

A double-stick tape is attached to the bottom of a sample container made of plastic with an internal volume of 30 cm$^3$, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold mounting resin (Cold mounting resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface is pressed against the rotary surface. The polishing plate is rotated at 1,000 rpm. The polishing is performed successively, using #500, #1000, and #2000 of the polishing plates in this order, and finally, mirror-surface polishing is performed, using alumina (BAIKALOX type (trade name) 0.3CR with a particle diameter of 0.3 µm, produced by BAIKOWSKI, available from Baikowski Japan).

The polished sample is fixed onto a preparation with clay and observed with a polarizing microscope (BX51, produced by Olympus Corporation).

[Polarizing Microscope Image Analysis Method]

The observation was performed at 200-fold magnification. An image observed with the polarizing microscope is photographed by connecting a CAMEDIA C-5050 ZOOM digital camera produced by Olympus Corporation to the polarizing microscope through an attachment. The shutter time is 1.6 seconds. Among the photographing data, images with 1,200×1,600 pixels were included in the analysis. It corresponds to investigation in a microscope field of 480 µm×540 µm. The image analysis was performed using ImageJ (produced by National Institutes of Health) to judge blue portions, yellow portions, magenta portions and black portions.

The parameters defining each color when ImageJ was used are given below.

TABLE 1

| | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the area and aspect ratio of each of blue, yellow and magenta optical structures are to be calculated.

As mentioned above, there is natural graphite as a negative electrode material which has relatively large structures and a small crystal interplanar spacing (d002) to be described later. By pulverization, natural graphite turns to a scale-like one which appears superficially similar to the carbon material of the present invention.

The Raman spectrum of the edge surface of the particles can be measured, for example, using NRS-5100 produced by JASCO Corporation, by observing not the smooth portions (basal surface) which are found predominantly but the edge surface portions selectively under the associated microscope.

When observing the particle edge surface (edge portion) of the carbon material by a Raman microspectrophotometer, the peak in a range of 1300 to 1400 cm$^{-1}$ is based on sp3 bonds and the peak in a range of 1580 to 1620 cm$^{-1}$ is based on sp2 bonds.

In the artificial graphite particles in a preferred embodiment of the present invention, the peak based on sp2 bonds is found to be higher. Specifically, when the edge surface of the particles of the carbon material is measured by Raman spectrometer, the area ratio $I_G/I_D$ (G value) between the peak area ($I_G$) in a range of 1580 to 1620 cm$^{-1}$ and the peak area ($I_D$) in a range of 1300 to 1400 cm$^{-1}$ observed by Raman spectroscopy spectra is from 5.2 to 100. G value is more preferably from 7.0 to 80 and still more preferably from 10 to 60. When the G value is too small, it promotes side reactions at the time of charge and discharge by the existence of many defects. By allowing the carbon material to have an appropriate G value, it becomes a graphite material which undergoes less self-discharge and degradation of a battery when it is held after charging.

The artificial graphite particles in a preferred embodiment of the present invention has an average interplanar distance (002) by the X-ray diffraction method of 0.337 nm or less. This increases the amount of lithium ions to be intercalated and desorbed; i.e. increases the weight energy density. Further, a thickness Lc of the crystal in the C-axis direction is preferably 50 to 1,000 nm from the viewpoint of the weight energy density and easiness to be collapsed. When d002 is 0.337 nm or less, most of the optical structures observed by a polarizing microscope are found to be optically anisotropic.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

In a preferred embodiment of the present invention, as pulverization of the artificial graphite particles is not performed after graphitization, a rhombohedral peak ratio is 5% or less, more preferably 1% or less.

When the graphite material falls in such ranges, an interlayer compound with lithium is formed smoothly. If the interlayer compound is used as a negative electrode material in a lithium secondary battery, the lithium occlusion/release reaction is hardly inhibited, which enhances a rapid charging/discharging characteristic.

It should be noted that the peak ratio (x) of the rhombohedral structure in the artificial graphite particles is obtained from actually measured peak strength (P1) of a hexagonal structure (100) plane and actually measured peak strength (P2) of a rhombohedral structure (101) plane by the following expression.

$$x=P2/(P1+P2)$$

In a preferred embodiment of the present invention, the BET specific surface area of the artificial graphite particles is 0.4 m$^2$/g to 5 m$^2$/g, more preferably 0.5 m$^2$/g to 3.5 m$^2$/g, and still more preferably 0.5 m$^2$/g to 3.0 m$^2$/g. By setting the BET specific surface area to be within the above-mentioned range, a wide area to be contacted with an electrolyte can be secured without excessive use of a binder, and thereby lithium ions can be smoothly intercalated and released, and the reaction resistance of the battery can be lowered.

The BET specific surface area is measured by a common method of measuring the absorption and desorption amount of gas per mass. As a measuring device, for example, NOVA-1200 can be used.

It is preferred that the loose bulk density (0 tapping) of the artificial graphite particles in a preferred embodiment of the present invention be 0.7 g/cm$^3$ or more, and the powder density (tap density) when tapping is performed 400 times be 0.8 to 1.6 g/cm$^3$. The powder density is more preferably 0.9 to 1.6 g/cm$^3$, most preferably 1.1 to 1.6 g/cm$^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 g/cm$^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

As a method for producing such artificial graphite particles, for example, a method described in JP 2013-019469 A can be adopted.

[Carbon Coating Layer]

The silicon-containing particles and artificial graphite particles are connected by a carbon coating layer (carbon coat). A carbon coating layer can be produced by, for example, carbonizing a carbon precursor of an organic compound and the like by heat treatment. There is no particular limit on the organic compound, and preferred are a petroleum-derived substance such as thermal heavy oil, thermally cracked oil, straight asphalt, blown asphalt, and tar or petroleum pitch obtained as a by-product in producing ethylene; and a coal-derived substance such as coal tar produced in coal carbonization, a heavy component obtained by removing a low-boiling-point component from coal tar by distillation, and coal-tar pitch (coal pitch). Petroleum- or coal-based pitch is particularly preferable. Pitch is an assembly of polycyclic aromatic compounds, has a higher carbon yield and contain a smaller amount of impurities compared to the case of using a monomer as a starting raw material. Furthermore, pitch has an advantage of making the silicon-containing particles less likely to be oxidized because pitch contains less oxygen.

The softening point of the pitch is preferably 80° C. or more and 300° C. or less. When the softening point of the pitch is low, the average molecular weight of the polycyclic aromatic compounds constituting the pitch is low, resulting in a low carbonization yield and an increase in production cost. Besides, such pitch offers a carbon coating layer having a porous structure because the pitch contains a volatile component in a large amount, and hence the pitch tends to cause an increase in irreversible capacity as an active material for a battery owing to a large specific surface area. When the softening point of the pitch is too high, the pitch has an advantage of a high carbonization yield by virtue of a high average molecular weight of the polycyclic aromatic compounds constituting the pitch, but in general, pitch having a high softening point has a high viscosity, and hence it tends to be difficult to uniformly disperse silicon-containing particles in the pitch dissolved in a solvent or in the molten pitch. When the softening point of the pitch falls within the above-mentioned range, pitch and the other components can be uniformly mixed, and a composite exhibiting suitable characteristics as the active material for a battery can be obtained.

The softening point of the pitch may be measured by a Mettler method described in ASTM-D3104-77.

The residual carbon ratio of the pitch is preferably 20 mass % or more and 70 mass % or less, more preferably 30 mass % or more and 60 mass % or less. When the residual carbon ratio is low, the production cost tends to be increased. Besides, such pitch offers a carbon coating layer having a porous structure because the pitch contains the volatile component in a large amount, and hence the pitch tends to cause an increase in irreversible capacity as the active material for a battery owing to a large specific surface area. When the residual carbon ratio is too high, the pitch has an advantage of a high carbonization yield, but in general, pitch having a high residual carbon ratio has a high viscosity, and hence it tends to be difficult to uniformly disperse silicon-containing particles in the pitch dissolved in a solvent or in the molten pitch. When the residual carbon ratio falls within the above-mentioned range, pitch and the other components can be uniformly mixed, and the composite exhibiting suitable characteristics as the active material for a battery can be obtained.

The residual carbon ratio is defined as a ratio of a residual amount with respect to a loaded amount, the residual amount being obtained through thermal analysis measurement at 1,100° C. under a nitrogen gas flow after pulverization of the pitch in a solid form with a mortar or the like. The residual carbon ratio is identical to a fixed carbon content in JIS K2425 measured at a carbonization temperature of 1,100° C.

The QI (quinolone insoluble) content in the pitch is preferably 10 mass % or less, more preferably 5 mass % or less, and still more preferably 2 mass % or less. The TI (toluene insoluble) content is preferably 10 mass % or more and 70 mass % or less.

The QI content of the pitch corresponds to its free carbon amount. When pitch containing a large amount of free carbon is subjected to heat treatment, the carbon adheres onto the surfaces of mesophase spheres in the course of appearance of the mesophase spheres, to form a three-dimension network and thus prevent the growth of the spheres. Thus, a mosaic structure is formed. In contrast, when pitch containing a small amount of free carbon is subjected to the heat treatment, the mesophase spheres grow larger to form needle coke. When the QI content falls within the above-mentioned range, electrode characteristics are more satisfactory.

In addition, when the TI content is small, the average molecular weight of the polycyclic aromatic compounds constituting the pitch is low, resulting in a low carbonization yield and an increase in production cost. Besides, such pitch offers a carbon coating layer having a porous structure because the pitch contains the volatile component in a large amount, and hence the pitch tends to cause an increase in irreversible capacity as the active material for a battery owing to a large specific surface area. When the TI content is too large, the pitch has an advantage of a high carbonization yield by virtue of a high average molecular weight of the polycyclic aromatic compounds constituting the pitch, but in general, pitch having a large TI content has a high viscosity, and hence it tends to be difficult to uniformly disperse silicon-containing particles in the pitch dissolved in a solvent or in the molten pitch. When the TI content falls within the above-mentioned range, pitch and the other components can be uniformly mixed, and a composite exhibiting suitable characteristics as the active material for a battery can be obtained.

The QI content and TI content of the pitch may be measured by a method disclosed in JIS K2425 or a method in conformity thereto.

[Production Method]

Carbon coating of the silicon-containing particles and artificial graphite particles with petroleum-based or coal-based pitch can be formed by a known method. For example, silicon-containing particles and artificial graphite particles are mixed first, and next the mixture of the silicon-containing particles and artificial graphite particles, and pitch are mixed and subjected to mechanochemical treatment with a device such as Hybridizer (trademark) manufactured by Nara Machinery Co., Ltd. Also, after dissolving pitch by an appropriate method, silicon-containing particles and artificial graphite particles may be mixed in the pitch in the liquid phase. Examples of a mixing method by dissolving pitch include a method of heating the pitch, silicon-containing particles and artificial graphite particles to a temperature higher than the softening point of the pitch, followed by stirring; and a method of dissolving pitch in various solvents used for solvent fractionation and adding silicon-containing particles and artificial graphite particles thereto to be mixed in the liquid phase.

The content of the silicon-containing particles is preferably 5 parts by mass or more and 30 parts by mass or less with respect to 100 parts by mass of the artificial graphite particles, more preferably 6 parts by mass or more and 25 parts by mass or less.

The amount of the carbon coating layer is preferably 5 mass % or more and 30 mass % or less in the composite material, more preferably 6 mass % or more and 25 mass % or less. The amount can be adjusted by the blending quantity of the petroleum-based or coal-based pitch.

Next, the mixture of artificial graphite particles and silicon-containing particles, onto which pitch adheres, is subjected to heat treatment at preferably 200° C. or more and 2,000° C. or less, more preferably 500° C. or more and 1,500° C. or less, still more preferably 600° C. or more and 1,300° C. or less. Through the heat treatment, the carbon-coated composite particles are obtained. When the heat treatment temperature is too low, carbonization of the pitch is not sufficiently completed, and hydrogen or oxygen remains on the artificial graphite particles to adversely affect the battery characteristics in some cases. In contrast, when the heat treatment temperature is too high, it could lead to excessive progress of crystallization which reduces charge characteristics, or cause metal fine particles to bond to carbon and to be inactive against Li with the result that they do not sufficiently contribute to charging and discharging.

The heat treatment is preferably preformed under a non-oxidizing atmosphere. Examples of the non-oxidizing atmosphere include an atmosphere filled with an inert gas, such as an argon gas or a nitrogen gas. In some cases, the carbon-coated artificial graphite particles fuse with each other to form an aggregate through the heat treatment, and hence are preferably pulverized so as to achieve the above-mentioned particle diameter in order to use the carbon-coated artificial graphite particles for an electrode active material.

The carbon coating plays roles in imparting conductivity to the silicon-containing particles, which are each originally a semiconductor and have low conductivity, reducing the expansion and contraction of Si, and as well, uniformly dispersing the silicon-containing particles on the surface of the base carbonaceous material. The Si fine particles are liable to be aggregated through a van der Waals' force. However, the silicon-containing particles are each a semiconductor as described above, and hence when the silicon-containing particles are aggregated to be present in an electrically insulated state, the silicon-containing particles do not sufficiently contribute to charging and discharging. As a result, such silicon-containing particles cause, as an active material for a lithium ion secondary battery, undesirable characteristics, such as a reduction in capacity, deterioration in cycle characteristics, and deterioration in rate characteristics.

The carbon coating layer is a layer for coating a core material, and hence it is important to measure the surface state of a negative electrode material obtained. As means for observing the surface of the negative electrode material, there is given, for example, observation of a surface shape with a SEM, evaluation of a carbon coating layer thickness with a TEM, measurement of a specific surface area using various gas molecules such as nitrogen, carbon dioxide, helium and xenon as a probe gas, measurement of a true density using butanol or helium as a probe gas, or evaluation of crystallinity on the surface of the negative electrode material by Raman scattering.

Of those, the following based on Raman scattering is generally performed: the ratio ($I_G/I_D$) of a peak area $I_G$ (derived from a graphite component) around 1,580 cm$^{-1}$ to a peak area $I_D$ (derived from an amorphous component) around 1,360 cm$^{-1}$ is calculated to be used as a G value. When the surface of the negative electrode material is coated with amorphous carbon, the $I_G$ decreases and the G value decreases. In addition, also the measurement of a specific surface area using a nitrogen gas as a probe gas is generally performed.

The negative electrode material in a preferred embodiment of the present invention has a G value of 1.65 or more and 10 or less. The G value is preferably 1.67 or more and 7 or less.

The negative electrode material in a preferred embodiment of the present invention has an average particle diameter (D50) of 5 μm or more and 30 μm or less, d002 of 0.339 or less, and BET specific surface area of 7 m$^2$/g or more and 20 m$^2$/g or less.

D50 and d002 can be measured by the methods described above, and the BET specific surface area can be measured by, for example, the method described in Examples.

(Paste for Negative Electrode)

A paste for a negative electrode according to one embodiment of the present invention contains the negative electrode material, a binder, and a solvent, and as required, a conductive assistant or the like. The paste for a negative electrode is obtained by, for example, mixing and kneading the negative electrode material, the binder, and the solvent, and as required, the conductive assistant or the like. The paste for a negative electrode may be formed into a sheet shape, a pellet shape, or the like.

Examples of the binder include polyethylene, polypropylene, an ethylene propylene terpolymer, butadiene rubber, styrene butadiene rubber, butyl rubber, acrylic rubber, and a polymer compound having a large ionic conductivity. Examples of the polymer compound having a large ionic conductivity include polyvinylidene fluoride, polyethylene oxide, polyepichlorohydrin, polyphosphazene, and polyacrylonitrile. The amount of the binder is preferably 0.5 part by mass or more and 100 parts by mass or less with respect to 100 parts by mass of the negative electrode material.

The conductive assistant is not particularly limited as long as the conductive assistant plays a role in imparting conductivity and electrode stability (buffering action on a volume change through intercalation and deintercalation of lithium ions) to the electrode. Examples thereof include vapor grown carbon fibers (e.g., "VGCF (trademark)" manufactured by Showa Denko K.K.), and conductive carbon (e.g., "DENKA BLACK (trademark)" manufactured by Denki Kagaku Kogyo Kabushiki Kaisha, "Super C65" manufactured by TIMCAL, "Super C45" manufactured by TIMCAL, or "KS6L" manufactured by TIMCAL). The amount of the conductive assistant is preferably 10 parts by mass or more and 100 parts by mass or less with respect to 100 parts by mass of the negative electrode material.

The solvent is not particularly limited, and examples thereof include N-methyl-2-pyrrolidone, dimethylformamide, isopropanol, and water. In the case of a binder using water as a solvent, a thickening agent is preferably used in combination. The amount of the solvent is adjusted so that the paste achieves such viscosity that the paste is easily applied onto a current collector.

(Negative Electrode Sheet)

A negative electrode sheet according to one embodiment of the present invention includes a current collector and an electrode layer for coating the current collector.

Examples of the current collector include a nickel foil, a copper foil, a nickel mesh, and a copper mesh.

The electrode layer contains a binder and the negative electrode material. The electrode layer may be obtained by, for example, applying the paste, followed by drying. A method of applying the paste is not particularly limited. The thickness of the electrode layer is generally from 50 μm to 200 μm. When the thickness of the electrode layer is too large, the negative electrode sheet cannot be accommodated in a standardized battery container in some cases. The thickness of the electrode layer may be adjusted by the application amount of the paste. In addition, the thickness may also be adjusted by performing pressure forming after drying the paste. As a method for the pressure forming, there is given a forming method, such as roll pressing or plate pressing, and the like. A pressure during the pressure forming is preferably from about 1 ton/cm² to about 5 ton/cm².

The electrode density of the negative electrode sheet may be calculated as described below. Specifically, the negative electrode sheet after the press forming is punched into a circular shape having a diameter of 16 mm, and its weight is measured. In addition, the thickness of an electrode is measured. The weight and thickness of the electrode layer can be understood by subtracting therefrom the weight and thickness of a current collector foil separately measured, and the electrode density is calculated based on the obtained values.

(Lithium Ion Battery)

A lithium ion battery according to one embodiment of the present invention includes at least one selected from the group consisting of a non-aqueous electrolytic solution and a non-aqueous polymer electrolyte, a positive electrode sheet, and the negative electrode sheet.

A positive electrode sheet which has hitherto been used for a lithium ion battery, specifically, a sheet including a positive electrode active material may be used as the positive electrode sheet to be used in the present invention. Examples of the positive electrode active material include $LiNiO_2$, $LiCoO_2$, $LiMn_2O_4$, $LiNi_{0.34}Mn_{0.33}CO_{0.33}O_2$, and $LiFePC_4$.

The non-aqueous electrolytic solution and the non-aqueous polymer electrolyte used for the lithium ion battery are not particularly limited. Examples thereof include: organic electrolytic solutions each obtained by dissolving a lithium salt, such as $LiClO_4$, $LiPF_6$, $LiAsF_6$, $LiBF_4$, $LiSO_3CF_3$, $CH_3SO_3Li$, or $CF_3SO_3Li$, into a non-aqueous solvent, such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, or γ-butyrolactone; gel polymer electrolytes each containing polyethylene oxide, polyacrylonitrile, polyvinylidene fluoride, polymethyl methacrylate, or the like; and a solid polymer electrolyte containing, for example, a polymer having an ethylene oxide bond.

In addition, a substance for causing a decomposition reaction in initial charging of the lithium ion battery may be added in a small amount to the electrolytic solution. Examples of the substance include vinylene carbonate (VC), biphenyl, propanesultone (PS), fluoroethylene carbonate (FEC), and ethylene sulfite (ES). The addition amount thereof is preferably 0.01 mass % or more and 50 mass % or less.

In the lithium ion battery of the present invention, a separator may be arranged between the positive electrode sheet and the negative electrode sheet. Examples of the separator include non-woven fabric, cloth, and a microporous film each containing as a main component a polyolefin, such as polyethylene or polypropylene, and a combination thereof.

EXAMPLES

The present invention is specifically described below by way of Examples and Comparative Examples. However, the present invention is by no means limited to these Examples.

Materials used in the examples to be described later are given below.

(1) Silicon-Containing Particles

Number-based average particle diameter of primary particle diameters calculated by the following equation: 50 nm $$d_{av}=6/(\rho \times BET)$$

On the assumption that the fine particles are dense spheres having an average diameter $d_{av}$ BET: BET specific surface area (m²/g) based on nitrogen adsorption ρ: true density of silicon particles (2.33 g/cm³ as a theoretical value) Oxygen content in the silicon-containing particles measured with inductively coupled plasma (ICP): 5.8 mass %

Observation with an electron microscope showed that 90% (number-based) or more of primary particles each had a diameter of 200 nm or less.

(2) Pitch
Petroleum Pitch (Softening Point: 220° C.).

Measurement by thermal analysis under a nitrogen gas flow showed that this petroleum pitch had a residual carbon ratio of 52% at 1,100° C.

Various physical properties in Examples are measured by the following methods.

(Particle Diameter)

Two micro spatulas of powder and two drops of a non-ionic surfactant (TRITON(trademark)-X; manufactured by Roche Applied Science) were added to 50 ml of water, and ultrasonically dispersed for 3 minutes. The dispersion was loaded in a laser diffraction particle size distribution measuring apparatus (LMS-2000e) manufactured by Seishin Enterprise Co., Ltd. and a volume-based cumulative particle size distribution was measured.

(Raman G Value)

The measurement was performed under the conditions of an excitation wavelength of 532 nm, an entrance slit width of 200 μm, an exposure time period of 15 seconds, a number of times of integration of 2, and a number of diffraction grating lines per millimeter of 600 through use of a laser Raman spectrometer (NRS-3100) manufactured by JASCO Corporation. The ratio ($I_G/I_D$) of a peak area $I_G$ (derived from a graphite component) around 1,580 cm$^{-1}$ to a peak area $I_D$ (derived from an amorphous component) around 1,360 cm$^{-1}$ was calculated from the measured spectrum. The calculated value was defined as a G value and used as an indicator of a graphitization degree.

(d002 and Lc)

The interlayer spacing d002 and the crystallite size Lc along a c-axis were determined from a 002 diffraction line in powder X-ray diffraction.

(Specific Surface Area; SSA)

The specific surface area was measured according to the multipoint BET method by Surface Area & Pore Size Analyzer/NOVA 4200e produced by Quantachrome Instruments using nitrogen gas as a probe gas under a relative pressure of 0.1, 0.2 and 0.3.

(Transmission Electron Microscope Image of the Surface Coating Layer; TEM)

After resin-embedding of the sample powder, the resultant was sliced into thin sections to be used as a sample for observation by TEM. The observation was conducted by HF2200 manufactured by Hitachi, Ltd. at an accelerating voltage of 200 kV. The surface coating layer of the composite was observed at 100,000-fold magnification, and the diameter of the spherical silicon particles existing in the field of view was calculated by calibration function to thereby determine the number average diameter.

(Production of Positive Electrode Sheet)

90 g of $LiCoO_2$, 5 g of carbon black (manufactured by TIMCAL) serving as a conductive assistant, and 5 g of polyvinylidene fluoride (PVdF) serving as a binder were stirred and mixed while N-methyl-pyrrolidone was appropriately added thereto. Thus, a slurry paste for a positive electrode was obtained.

The paste for a positive electrode was applied onto an aluminum foil having a thickness of 20 μm with a roll coater, followed by drying, to yield a sheet for a positive electrode. The electrode after the drying was pressed to a density of 3.6 g/cm$^3$ with a roll press. Thus, a positive electrode sheet for battery evaluation was obtained.

(Production of Negative Electrode Sheet)

Polyacrylic acid (PAA) and carboxymethylcellulose (CMC) were prepared as binders. PAA in a white powder form was dissolved in purified water to yield a PAA solution.

In addition, CMC in a white powder form was mixed with purified water, followed by stirring with a stirrer for a whole day and night, to yield a CMC solution.

Carbon black and a vapor grown carbon fiber (VGCF (trademark)-H, manufactured by Showa Denko K.K.) were prepared as conductive assistants, and a mixed conductive assistant obtained by mixing those assistants at a ratio of 3:2 (mass ratio) was used.

90 Parts by mass of each composite produced in Examples and Comparative Examples, 5 parts by mass of the mixed conductive assistant, the CMC solution containing 2.5 parts by mass of a solid content, and the PAA solution containing 2.5 parts by mass of a solid content were mixed, and an appropriate amount of water was added thereto for viscosity adjustment, followed by kneading with a planetary centrifugal mixer. Thus, a paste for a negative electrode was obtained.

The paste for a negative electrode was uniformly applied onto a copper foil having a thickness of 20 μm with a doctor blade so as to achieve a thickness of 150 μm, followed by drying with a hot plate and then vacuum drying. Thus, a sheet for a negative electrode was obtained. The electrode after the drying was pressed with a uniaxial press machine at a pressure of 3 ton/cm$^2$. Thus, a negative electrode sheet for battery evaluation was obtained.

(Capacity Ratio of Positive Electrode to Negative Electrode)

When a lithium ion battery is produced by allowing a positive electrode sheet and a negative electrode sheet to face each other, it is necessary to consider balance between the capacities of the electrodes. That is, when the capacity of a negative electrode, which is a lithium ion accepting side, is too low, Li excessively precipitates on the negative electrode side to cause deterioration in cycle characteristics. In contrast, when the capacity of the negative electrode is too high, an energy density is reduced through charge and discharge in a low load state, while the cycle characteristics are improved. In order to prevent the foregoing, the discharge amount of the negative electrode sheet per weight of an active material was evaluated in advance in a half cell using Li as a counter electrode, and the capacity of the negative electrode sheet was finely adjusted so that the ratio of the capacity of the negative electrode sheet ($Q_A$) to the capacity of the positive electrode sheet ($Q_C$) was a constant value of 1.2, while the same positive electrode sheet was used.

(Production of Battery for Evaluation)

The following operation was performed in a glove box in which a dry argon gas atmosphere having a dew point of −80° C. or less was retained.

The negative electrode sheet and the positive electrode sheet were punched to yield a negative electrode piece and a positive electrode piece each having an area of 20 cm$^2$, respectively. An Al tab and a Ni tab were attached to the Al foil of the positive electrode piece and the Cu foil of the negative electrode piece, respectively. A film microporous membrane made of polypropylene was sandwiched between the negative electrode piece and the positive electrode piece, and the resultant was packed in an aluminum laminate in this state. In addition, an electrolytic solution was injected thereinto. After that, an opening was sealed through heat fusion. Thus, a battery for evaluation was produced. It should be noted that the electrolytic solution was a solution obtained by mixing 1 mass % of vinylene carbonate (VC) and 30 mass % of fluoroethylene carbonate (FEC) with a solvent obtained by mixing ethylene carbonate, ethyl methyl carbonate, and diethyl carbonate at a ratio of 3:5:2 in terms of volume ratio, and further dissolving therein $LiPF_6$ as an electrolyte at a concentration of 1 mol/L.

(Charge-Discharge Cycle Test)

Aging was performed by repeating charge and discharge 5 times at a current value of 0.2 C, and then a charge-discharge cycle test was performed by the following method.

The charging was performed at an upper limit voltage of 4.2 V in a constant current (CC) mode at a current value of 1 C and a constant voltage (CV) mode at a cut-off current of 0.05 C.

The discharging was performed at a lower limit voltage of 2.8 V in a CC mode at a current value of 1 C.

The charging and discharging operations were performed 100 cycles when the above-mentioned charging and discharging operations were defined as 1 cycle, and a discharge amount retention rate after the Nth cycle defined by the following equation was calculated.

(Discharge amount retention rate after $N$th cycle (%))=(discharge capacity in $N$th cycle)/(discharge capacity in initial cycle)×100

Example 1

Petroleum-based coke was pulverized and subjected to heat treatment in Acheson furnace at 3,000° C. to obtain scale-like artificial graphite particles (B1) having the following physical properties:
10% particle diameter (D10): 7.8 µm,
BET specific surface area: 1.9 m$^2$/g,
d002: 0.3359 nm,
Lc: 154 nm,
50% particle diameter (D50): 22.1 µm,
90% particle diameter (D90): 46.1 µm, and
$I_G/I_D$ (G value): 16.7. By observing the optical structures in the cross-section of the formed body made of B1 in a rectangular field of view of 480 µm×640 µm under a polarizing microscope, when areas of the optical structures are accumulated from a smallest structure in an ascending order, SOP that represents the area of an optical structure whose accumulated area corresponds to 60% of the total area of all the optical structures was found to be 13.4 µm$^2$; when the structures are counted from a structure of a smallest aspect ratio in an ascending order of, and AROP that represents the aspect ratio of the structure which ranks at the position of 60% in the total number of all the structures was found to be 2.14.

Next, the silicon-containing particles, artificial graphite particles (B1) and the pitch were put in a container so that the mass ratio of the silicon-containing particles as being non-carbonaceous to the artificial graphite particles (B1) and the pitch after carbonization (calculated from a residual carbon ratio; hereinafter may be referred to as "component derived from petroleum pitch") was 1:9, and that the amount of the component derived from petroleum pitch was 10 mass % to the total amount of the silicon-containing particles, artificial graphite particles (B1) and the component derived from petroleum pitch. An acetone/quinoline mixed solvent was added thereto and stirred to obtain a mixture slurry in which each of the components was dispersed in the solvent. At this time, the silicon-containing particles were found to be well dispersed without being floated and separated. The mixture slurry was spread over a stainless tray for preliminary drying to obtain a solid precursor, in which silicon-containing particles and artificial graphite particles are uniformly dispersed. Subsequently, the solid precursor was placed in a firing furnace, and subjected to carbonization firing by being retained at 1,100° C. for 1 hour under a nitrogen gas flow. After that, the resultant was pulverized and sieved with a 45 µm sieve to obtain a composite. An average diameter of the spherical silicon particles existing in the surface coating layer of the composite, which was calculated by the TEM observation, was 56 nm.

The composite was evaluated for the discharge capacity, the cycle characteristics, Raman G value, specific surface area, d002 and D50. The results are shown in Tables 1 and 2.

Example 2

A composite was produced in the same way as in Example 1 except that the amount of the component derived from petroleum pitch was changed to 20 mass % to evaluate the discharge capacity, the cycle characteristics, Raman G value, specific surface area, d002 and D50. The results are shown in Tables 1 and 2.

Example 3

A composite was produced in the same way as in Example 1 except that the amount of the component derived from petroleum pitch was changed to 30 mass % to evaluate the discharge capacity, the cycle characteristics, Raman G value, specific surface area, d002 and D50. The results are shown in Tables 1 and 2. Also, the scanning electron microscope image of the obtained composite is shown in FIG. 1.

Comparative Example 1

Petroleum-based coke was pulverized and subjected to heat treatment in Acheson furnace at 3,000° C. to obtain aggregated artificial graphite particles (B2) having the following physical properties:
10% particle diameter (D10): 2.5 µm,
BET specific surface area: 3.2 m$^2$/g,
d002: 0.3363 nm,
Lc: 61 nm,
50% particle diameter (D50): 5.1 µm,
90% particle diameter (D90): 12.3 µm, and
$I_G/I_D$ (G value): 16.7. By observing the optical structures in the cross-section of the formed body made of B1 in a rectangular field of view of 480 µm×640 µm under a polarizing microscope, when areas of the optical structures are accumulated from a smallest structure in an ascending order, SOP that represents the area of an optical structure whose accumulated area corresponds to 60% of the total area of all the optical structures was found to be 6.24 µm$^2$; when the structures are counted from a structure of a smallest aspect ratio in an ascending order of, and AROP that represents the aspect ratio of the structure which ranks at the position of 60% in the total number of all the structures was found to be 1.93.

A composite was produced in the same way as in Example 1 except that artificial graphite particles (B2) were used instead of artificial graphite particles (B1). The composite was evaluated for the discharge capacity, the cycle characteristics, Raman G value, specific surface area, d002 and D50. The results are shown in Tables 1 and 2. Also, the scanning electron microscope image of the obtained composite is shown in FIG. 2.

Comparative Example 2

A composite was produced in the same way as in Comparative Example 1 except that the amount of the component derived from petroleum pitch was changed to 20 mass % to evaluate the discharge capacity, the cycle characteristics, Raman G value, specific surface area, d002 and D50. The results are shown in Tables 1 and 2.

Comparative Example 3

A composite was produced in the same way as in Comparative Example 1 except that the amount of the component derived from petroleum pitch was changed to 30 mass % to evaluate the discharge capacity, the cycle characteristics, Raman G value, specific surface area, d002 and D50. The results are shown in Tables 1 and 2.

Comparative Example 4

100 g of Chinese scale-like natural graphite (solid carbon content: 99%, specific surface area: 9.1 m²/g, D50: 26.8 μm) was processed with Hybridization System NHS-1 produced by Nara Machinery Co., Ltd. at a rotation speed of 50 m/s for three minutes. The treatment was repeated until the sample amount reaches 3.6 kg. After adding 0.4 kg of petroleum pitch pulverized so as to have D50 of 6 μm, the mixture was put into a Loedige Mixer produced by MATSUBO Corporation, and mixed until it becomes uniform by visual observation. Subsequently, 200 g of the mixture was put in an alumina crucible and heated to 1,300° C. under nitrogen atmosphere and maintained at the temperature for two hours. The obtained heat-treated product was pulverized with a pin mill, and particles having a size of 2 μm or less and particles having a size of 45 μm or more were classified and removed until they are not substantially observed in the product by a particle size distribution analyzer, thereby obtaining artificial graphite particles (B3).

A composite was produced in the same way as in Example 1 except that artificial graphite particles (B3) were used instead of artificial graphite particles (B1). The composite was evaluated for the discharge capacity, the cycle characteristics, Raman G value, specific surface area, d002 and D50. The results are shown in Tables 1 and 2.

TABLE 1

| | Graphite particles | Amount of carbon coating | Discharge capacity [mAh/g] | Cycle characteristics (after 100th cycle) |
|---|---|---|---|---|
| Example 1 | B1 | 10% | 497 | 68.0% |
| Example 2 | | 20% | 493 | 72.4% |
| Example 3 | | 30% | 462 | 74.7% |
| Comparative Example 1 | B2 | 10% | 500 | 65.1% |
| Comparative Example 2 | | 20% | 492 | 61.5% |
| Comparative Example 3 | | 30% | 466 | 57.4% |
| Comparative Example 4 | B3 | 10% | 485 | 50.6% |

As can be seen from Table 1, the negative electrode materials in Examples 1 to 3 exhibits more excellent cycle characteristics compared to those in Comparative Examples 1 to 4.

TABLE 2

| | G Value | SSA [m²/g] | d002 [nm] | D50 [μm] |
|---|---|---|---|---|
| Example 1 | 2.17 | 11.5 | 0.336 | 8.9 |
| Example 2 | 2.50 | 12.1 | 0.337 | 8.6 |
| Example 3 | 1.69 | 12.7 | 0.337 | 6.9 |
| Comparative Example 1 | 1.61 | 13.1 | 0.336 | 4.8 |
| Comparative Example 2 | 1.56 | 9.1 | 0.337 | 4.4 |
| Comparative Example 3 | 1.59 | 14.6 | 0.336 | 4.5 |
| Comparative Example 4 | 12.50 | 4.6 | 0.335 | 28.2 |

As can be seen from Table 2, the G value and D50 value of negative electrode materials in Examples 1 to 3 are higher compared to those in Comparative Examples 1 to 4.

According to the present invention, a negative electrode having a large discharge amount per mass can be obtained. In addition, through use of the negative electrode material of the present invention, the lithium ion battery having a high capacitance and excellent charge-discharge cycle characteristics can be produced.

The invention claimed is:

1. A negative electrode material for a lithium ion battery, made of a composite material comprising silicon-containing particles, artificial graphite particles and a carbon coating layer, wherein the silicon-containing particles are silicon particles having a SiOx layer (0<x≤2) on a surface of the particle, have an oxygen content ratio of 1 mass % or more and 18 mass % or less, and mainly comprise particles having a primary particle diameter of 200 nm or less; and the artificial graphite particles have a scale-like shape, wherein the ratio $I_G/I_D$ (G value) of the negative electrode material between the peak area ($I_G$) of a peak in a range of 1580 to 1620 cm$^{-1}$ and the peak area ($I_D$) of a peak in a range of 1300 to 1400 cm$^{-1}$ measured by Raman spectroscopy spectra is 1.65 or more and 10 or less, and wherein the ratio $I_G/I_D$ (G value) between the peak area ($I_G$) of a peak in a range of 1580 to 1620 cm$^{-1}$ and the peak area ($I_D$) of a peak in a range of 1300 to 1400 cm$^{-1}$ measured by Raman spectroscopy spectra when an edge surface of the artificial graphite particle is measured with Raman microspectrometer is 5.2 or more and 100 or less; the average interplanar spacing d002 of plane (002) of the artificial graphite particles by the X-ray diffraction method is 0.337 nm or less; and by observing the optical structures in the cross-section of the formed body made of the artificial graphite particles in a rectangular field of 480 μm×640 μm under a polarizing microscope, when areas of the optical structures are accumulated from a smallest structure in an ascending order, SOP represents an area of an optical structure whose accumulated area corresponds to 60% of the total area of all the optical structures; when the structures are counted from a structure of a smallest aspect ratio in an ascending order, AROP represents the aspect ratio of the structure which ranks at the position of 60% in the total number of all the structures; and when D50 represents a volume-based average particle diameter by laser diffraction method; SOP, AROP and D50 satisfy the following relationship:

1.5≤AROP≤6 and 0.2×D50≤(SOP×AROP)$^{1/2}$<2×D50.

2. The negative electrode material for a lithium ion battery as claimed in claim 1, wherein the content of the silicon-containing particles is 5 parts by mass or more and 30 parts by mass or less to 100 parts by mass of the artificial graphite particles.

3. The negative electrode material for a lithium ion battery as claimed in claim 1, wherein a volume-based average particle diameter by laser diffraction method (D50) of the negative electrode material is 5 μm or more and 30 μm or less.

4. The negative electrode material for a lithium ion battery as claimed in claim 1, wherein the BET specific surface area of the negative electrode material is 7 $m^2/g$ or more and 20 $m^2/g$ or less.

5. The negative electrode material for a lithium ion battery as claimed in claim 1, wherein the average interplanar spacing d002 of plane (002) by the X-ray diffraction method of the negative electrode material is 0.339 nm or less.

6. The negative electrode material for a lithium ion battery as claimed in claim 1, wherein the carbon coating layer is obtained by subjecting petroleum pitch or coal pitch to heat treatment.

7. The negative electrode material for a lithium ion battery as claimed in claim 1, wherein the mass of the carbon coating layer is 5 mass % or more and 30 mass % or less in the composite material.

8. A paste comprising the negative electrode material for a lithium ion battery claimed in claim 1 and a binder.

9. An electrode using a formed body of the paste for an electrode claimed in claim 8.

10. A lithium ion battery comprising the electrode claimed in claim 9 as a constituting element.

* * * * *